Figure 1:
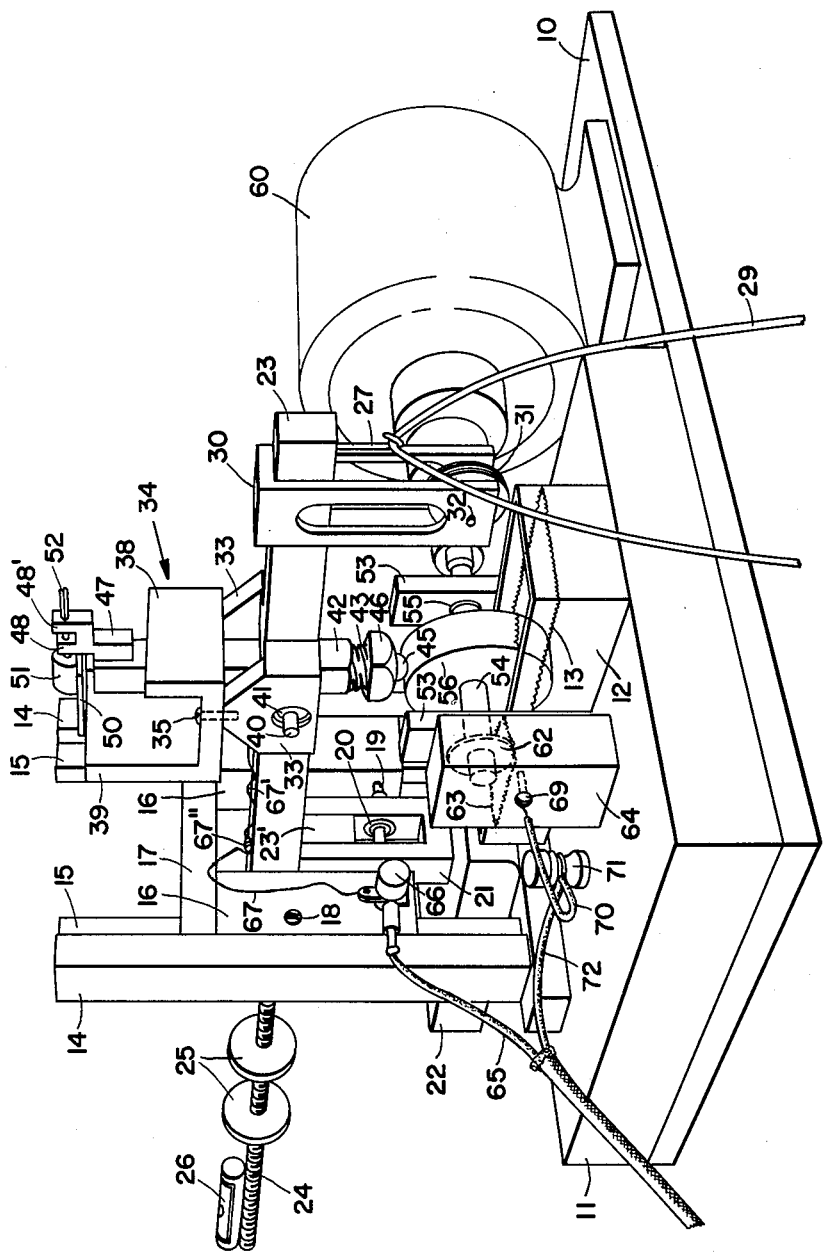

April 21, 1964
M. J. FUREY ETAL
3,129,580
APPARATUS FOR MEASURING FRICTION AND CONTACT
BETWEEN SLIDING LUBRICATED SURFACES
Filed Jan. 3, 1961
4 Sheets-Sheet 1

Michael J. Furey
James A. Wilson   INVENTORS

BY Frank T. Johmann

PATENT ATTORNEY

Michael J. Furey
James A. Wilson     INVENTORS

BY Frank T. Johmann

PATENT ATTORNEY

Michael J. Furey
James A. Wilson   INVENTORS

BY Frank T. Johmann

PATENT ATTORNEY

Michael J. Furey
James A. Wilson   INVENTORS

BY *Frank T. Johmann*

PATENT ATTORNEY

United States Patent Office 3,129,580
Patented Apr. 21, 1964

3,129,580
APPARATUS FOR MEASURING FRICTION AND CONTACT BETWEEN SLIDING LUBRICATED SURFACES
Michael J. Furey, Berkeley Heights, and James A. Wilson, Lake Lackawanna, Stanhope, N.J., assignors to Esso Research and Engineering Company, a corporation of Delaware
Filed Jan. 3, 1961, Ser. No. 80,474
5 Claims. (Cl. 73—10)

This invention relates to an apparatus suitable for measuring the extent of metallic contact and/or friction occurring between rubbing surfaces. Particularly, the invention relates to an apparatus designed to investigate the effect of different lubricants and lubricant additives on friction, wear, scuffing, and the extent of metallic contact under conditions of different loading, sliding speeds, geometry of the contacting surfaces, or other variable conditions.

In its preferred form, the apparatus comprises a fixed metal ball maintained in contact with a rotating cylinder. The lower portion of the cylinder is immersed in a bath of the lubricant to be tested, so as to maintain a film of lubricant on the rotating cylinder. The ball is adapted for loading, i.e. weights can be positioned to increase the pressure between the ball and the cylinder. A low voltage is applied across the ball and cylinder. The resistance across the ball-cylinder junction is measured and the occurrence of metallic contact can be readily determined. If the lubricant film breaks for any reason, then metal to metal contact will result and the electrical resistance will be very low. On the other hand, as long as the lubricant film is present, it will constitute a large resistance thereby resulting in a large voltage drop. In actual practice, and even under relatively mild conditions, it has been found that generally the resistance tends to widely fluctuate between metallic contact and non-metallic contact. This might be due to very slight surface irregularities on the ball and rotating cylinder which, of course, will result in varying resistance. However, by being able to measure average resistance over a time period, the relative effectiveness of various lubricants in preventing metal-to-metal contact, under set conditions, can be determined. Provision is also made in the apparatus for measuring the amount of friction between the ball and cylinder. The ball is fixed to the lower end of a pivoted arm so that the drag exerted on the ball by the contacting rotating cylinder results in a slight movement of the arm. This movement is measured electrically by having the upper end of the pivoted arm carry an iron core which extends within a differential transformer. Variation of the position of the iron core inside the transformer results in a variation of the electrical inductance of the transformer. This variation in electrical inductance is readily converted into either length, or force, or coefficient of friction. It will be readily apparent that the more slippery or more oily the lubricant, the lower the coefficient of friction and the more slipping will occur between the two metal surfaces. This, in turn, will result in less drag and less pivoted movement of the arm.

The present apparatus is relatively simple and effective. By means of this apparatus, various properties of lubricating oils and their additives may be readily investigated. For example, the effectiveness of a lubricant or of a lubricant containing an oil additive in reducing friction and preventing metal-to-metal contact may be investigated under conditions of varying pressure, varying sliding speeds, etc.

The invention will be further understood by reference to the accompanying drawings which represent a preferred form of the invention.

Figure 2:
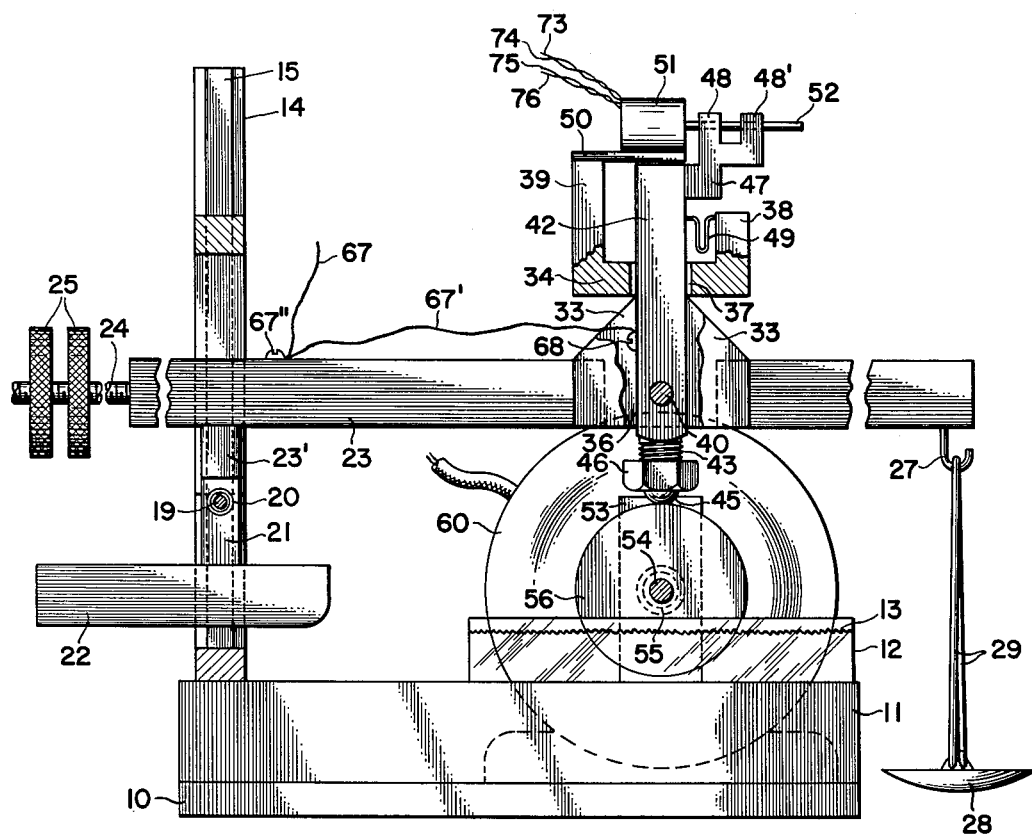
Figure 3:
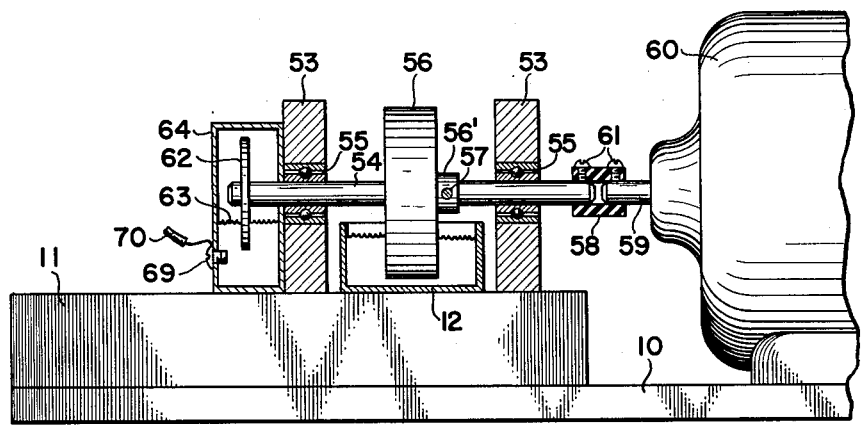
Figure 4:
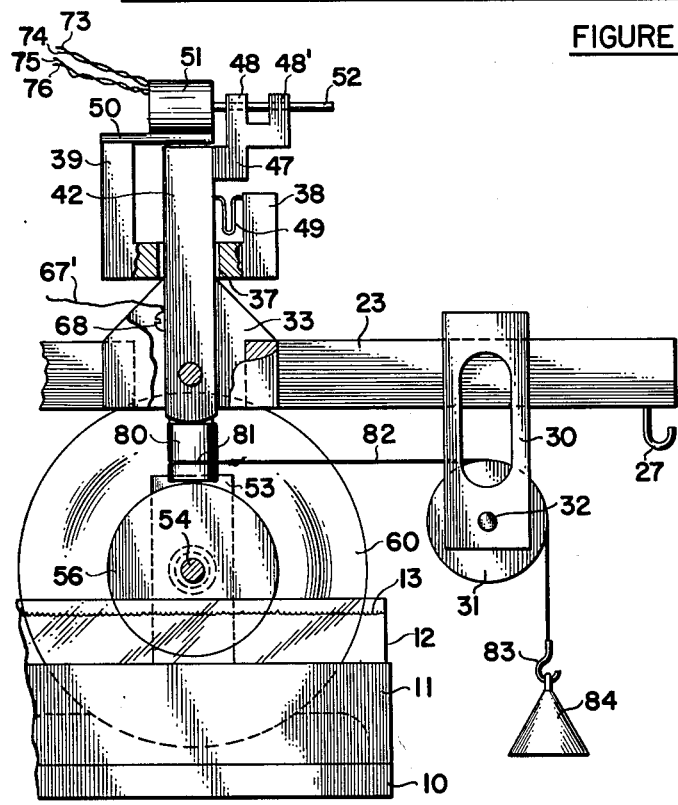
Figure 5:
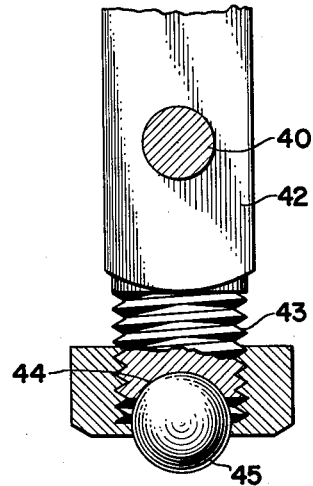
Figure 6:
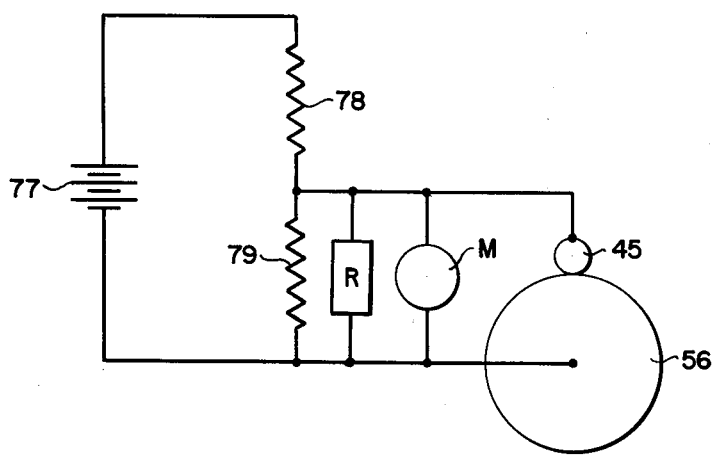
Figure 7:
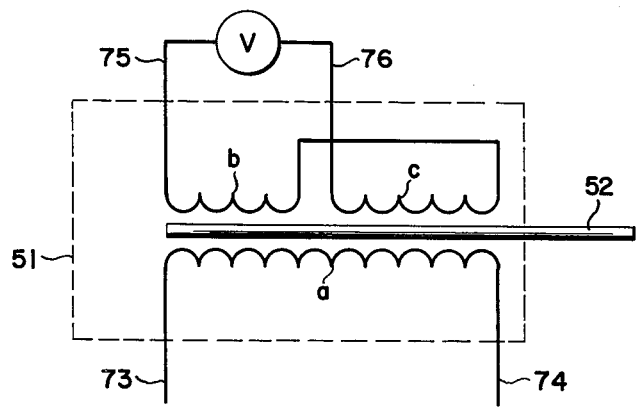

In the drawings:
FIGURE 1 is a perspective view of the apparatus.
FIGURE 2 is a side view, partly in section, of the apparatus.
FIGURE 3 is a front fragmentary view of the apparatus.
FIGURE 4 is a side fragmentary view illustrating a method for calibration of the instrument.
FIGURE 5 is a detailed view showing the manner of clamping the ball to its pivoted arm.
FIGURE 6 is a schematic representation of the wiring system for measuring the electrical resistance between the ball and cylinder.
FIGURE 7 is a schematic representation of the wiring system of the differential transformer used to measure friction between the ball and rotating cylinder.

Reference is now made to the drawings in detail:
The apparatus is mounted on the base plate 10, which carries a block of electrical insulation 11 upon which is fixed the rectangular tank or container 12 carrying the test lubricant 13. Two spaced upright standards 14 are mounted on the block 11. Each standard 14 has a T-shaped cross-section to define a tongue 15. The tongues 15 extend into slots formed in the sides of the inverted channel frame defined by the upright members 16 connected at their upper ends by the cross member 17. The inverted channel frame defined by the members 16 and 17, is slidable on the upright standards 14 and can be locked into a fixed position relative to said standards 14 by means of the set screw 18. A pivot pin 19 has its ends fixed to the spaced upright members 16 and passes through precision bearings 20 fixed in the channel member 21. Fixed to the lower end of the member 21, is the stabilizer and counter weight 22, while fixed to the upper end of the pivotedly mounted member 21, is the arm 23. The rearward portion of the arm 23, carries a threaded extension member 24, which in turn, threadedly engages the balancing discs 25. A bubble level 26 is carried at the end of the threaded extension 24. Proximate the forward end of the arm 23, is fixed a hook 27 which carries the weight pan 28 by means of the wire hook 29. Fixed to the arm 23, inwardly from the hook 27, is an inverted channel frame 30. A pulley wheel 31 is mounted for rotation on the pin 32 carried between the sides of said channel frame 30. Further inward on said arm 23 are formed a pair of brackets or supports 33, upon which is bolted the channel bracket 34 by means of bolts 35. The arm 23, tongue 23' and supports 33 are preferably formed of a single unitary piece of metal to ensure maximum rigidity. A slot 36 is formed in the arm 23 between the brackets 33. The bracket 34 includes a bottom portion defining a slot 37 and the two upwardly extending sides 38 and 39. A pin 40 has its ends mounted in bearings 41 fixed in the brackets 33. The pin 40 is vertically aligned with the bolts 35. The pivot bar 42 extends through said slots 36 and 37 and is fixed to the pin 40. The lower end of the bar 42 is externally threaded as at 43 and internally defines a recess 44. A metal ball 45 is held fixed against the recess 44 by means of the locking nut 46 threadedly engaging the bar 42. At the upper end of the pivoted bar 42 is fixed the bracket 47 including the arms 48 and 48'. A spring 49 has one of its ends fixed to the pivoted bar 42 and its other end fixed to the channel side 38. The opposite channel side 39, has fixed to its upper end the plate 50, which supports the differential transformer 51. An iron core 52, fixed to the arms 48 and 48' has a free end extending into the differential transformer 51.

Rigid uprights 53, supported by the block 11, are disposed on either side of the reservoir 12, and support the rotatable shaft 54 extending therethrough in bearings 55. A metal cylinder 56, having a hub portion 56' is fixed to the shaft 54 by means of a set screw 57. One end of the shaft 54, is coupled through a rubber insulating coupling 58, to the shaft 59 of the variable speed motor 60 by means of set screws 61. Fixed to the other end of the shaft 54, is a thin copper disc 62, the lower portion of which is immersed in a pool of mercury 63, maintained in the non-metallic, non-conducting container 64. It is preferred that the disc 62 be relatively thin to minimize splattering the mercury pool 63. Also, the disc 62 is preferably of copper or copper alloy in order to ensure good electrical conductivity between the disc and the mercury. Other metals, such as steel, form a film of corrosion which interferes with the passage of electrical current and are therefore to be avoided.

The electrical lead wire 65 has one end fixed to the member 16 by means of the terminal screw 66. A small flexible bare copper wire 67, carries current from the terminal 66 to the terminal screw 67" on the pivoted arm 23, while a second wire 67' carries the current to the terminal screw 68 on the vertically pivoted arm 42. Electric current can then pass down the arm 42, to the ball 45, across any lubricant film, onto the rotating sleeve 56, then along the shaft 54, through the copper disc 62, into the pool of mercury 63, through the metallic terminal 69 extending into said mercury pool, along the wire 70, through the terminal 71 and finally out the return wire 72 back to the source.

Current from another source is supplied through the lines 73 and 74 to the differential transformer, while a secondary current generated therein passes through the lines 75 and 76 to a measuring instrument.

In operation, the reservoir 12 is filled with the oil or lubricant to be tested. The sides of the reservoir 12, are preferably transparent to allow better observation of the test. The rotating disc 56 is driven at a selected constant speed by the variable speed motor 60. The main arm 23 is adjusted so that it is level, i.e. horizontal, with the fixed metal ball 45 just barely in contact with the top surface of the rotating cylinder 56. This adjustment is made by shifting the inverted channel frame defined by the members 16 and 17 upon the T standards 14, then locking the channel frame to said standards by means of the set screw 18. Final adjustment is made by means of the threaded discs 25 until the bubble level 25 shows that the arm 23 is horizontal. At this point, the ball 45 will be just barely contacting the cylinder 56 and this point of contact will preferably be horizontal with the axial center line of the pin 19. The desired weights are then placed in the pan 28 so as to apply load to the ball 45 to force it into pressure engagement with the top of the rotating cylinder 56.

The electrical measurement of the voltage drop or resistance across the ball-cylinder junction is illustrated schematically in FIGURE 6. Here, direct current from a low voltage battery or other source 77 is passed through a first large resistance 78 and then divides, one part passing through the smaller resistance 79 and other part passing through the ball-cylinder junction, and finally recombining and returning to the source. In one actual operation a 1.5 volt battery was used, the first resistance 78 was 1 meg. ohms while the smaller resistance 79 was 10,000 ohms. This reduced the applied voltage to 15 millivolts. When complete metal to metal contact occurred across the ball-cylinder junction, then the voltage drop as measured by the measuring device M is zero since there was substantially no resistance to the flow of current across the junction and therefore no voltage drop. On the other hand, when an oil film prevented metal-to-metal contact and caused substantial resistance (in the order of $10^6$ to $10^{18}$ times as great as a metal-to-metal junction), then the voltage drop is 15 millivolts which represents the voltage drop across the resistance 79. In actual practice, the voltage frequently fluctuated between the two extremes. While a simple voltmeter can be used as the measuring device M, best results are obtained by using an oscilloscope where the instantaneous resistance can be viewed and photographed. In addition, a recorder R which records average electrical resistance as a function of time has been found useful. Such means of measuring voltage drop are well-known and conventional, and a number of measuring means M can be utilized. It will also be apparent that different resistance values for the resistances 78 and 79 can be used. However, to prevent electrical discharge across thin films of oil at the ball-cylinder junction, it is preferred that the voltage applied across the junction be on the order of 15 millivolts or less. At voltages of 0.2 or 0.3 volt, there is a tendency for the current to discharge, which makes effective measurement impossible. Also, higher voltages tend to break down the oil and cause deposits.

During operation, as noted above, there will be a tendency for the arm 42 to pivot about the pin 40, against the force of the spring 49, due to a dragging effect exerted by the driven cylinder 56 upon the contacting ball 45. The force of the spring 49 should be such so as to limit the arcuate movement of the ball 45 as much as possible (e.g. 0.00001 to 0.0005 inch). However, this slight movement results in moving the iron core 52 to a new position within the differential transformer 51. This extremely small distance can result in a relatively large change in the output of current from the differential transformer 51. A method of measuring this variation in current is schematically represented in FIGURE 7. Here, the dotted line box represents the transformer 51. Alternating current is passed through the first coil $a$ through wires 73 and 74. Secondary currents are induced in the coils $b$ and $c$, while the difference in voltage of said secondary currents can be measured by the A.C. voltmeter V. A slight movement of the iron core 52 results in a wide variation in the voltage shown by the voltmeter V as the output of each of the two coils $b$ and $c$ vary with the position of the core 52. If desired, the output current from the differential transformer may be rectified and continuously recorded on a recorder by conventional techniques.

FIGURE 4 illustrates the manner in which the friction-measuring portion of the instrument can be calibrated. Here' the ball 45 is replaced by the cylinder 80 formed with a slot 81. The cylinder 80 is internally threaded so as to thread onto the threads 43 of the pivoted arm 42. A thin, flexible string or wire 82 has a loop at one end engaged in said slot 81, while its other end is passed over the pulley 31 and carries a hook 83. A known weight, indicated at 84, may then be placed on the hook and the amount of movement of the arm 42 is then measured by means of the differential transformer 51, previously described. By the addition of known weights, the corresponding output from the differential transformer is determined. Then, when later running a test on an oil, the output from the transformer can in turn be translated into weight or force.

After making a test run on a given lubricant, the ball 45 may be replaced by a new ball and the position of the cylinder 56 can be adjusted on its shaft 54 by means of the set screw 57. In this way, fresh surfaces may be presented for subsequent testing. Also the remnants of the prior test lubricant can be conveniently rinsed away by use of hexane or other volatile solvent.

Examples of the specific use of an instrument of the invention have been given in a paper titled: "Metallic Contact and Friction Between Sliding Surfaces," by M. J. Furey, one of the present co-inventors, at the ASLE/ASME Lubrication Conference, Boston, October 17, 18, 19, 1960. This paper has been published by the American Society of Lubrication Engineers, 5 N. Wabash Ave., Chicago 2, Illinois, under the above-noted title and the designation "Preprint No. 60–LC–10." This paper is herewith incorporated in its entirety in the present patent application.

What is claimed is:

1. An apparatus useful for simultaneously measuring friction and effectiveness of lubricants in preventing direct metal-to-metal contact between sliding metallic surfaces which comprises: a supporting means including a horizontal base, a vertical upright supported by said base, and a horizontal arm pivoted on said upright; a vertical arm having upper and lower ends pivotedly mounted between said ends on said horizontal arm; a metal ball fixed to the lower end of said vertical arm; a lubricant reservoir mounted on said horizontal base; a rotatable metal cylinder having its lower portion within said reservoir and its upper portion in bearing engagement with said metal ball, whereby a lubricant film is formed between said rotatable cylinder and said metal ball when said cylinder is rotated and when said reservoir contains lubricant; means for applying a load to said vertical arm whereby said ball is urged into pressure engagement with said rotatable cylinder and whereby an electrical circuit is formed by said vertical arm, said ball and said cylinder; a first measuring means for measuring the average electrical resistance between said ball and said rotatable cylinder as a function of time upon passing an electrical current through said circuit; and a second measuring means for simultaneously measuring the amount of deflection of said vertical arm caused by drag exerted upon said ball by said cylinder when said cylinder is rotated in lubricated bearing engagement against said ball, said second means including a differential transformer fixed to said horizontal arm, and an iron core having ends and fixed proximate the upper end of said pivotedly mounted vertical arm, said iron core having one end extending into said differential transformer whereby pivotal movement of said vertical arm varies the position of said core within said transformer to thereby cause variation in the electrical output of said transformer.

2. An apparatus useful for simultaneously measuring friction and the extent of metallic contact between sliding lubricated surfaces which comprises in combination:
(a) a metal member,
(b) a rotatable metal cylinder in singular contact with said metal member,
(c) means for passing an electrical current through said metal member and said rotatable cylinder,
(d) means for lubricating said rotatable metal cylinder and said metal member,
(e) means for applying load to said metal member urging it into pressure engagement with said rotatable cylinder,
(f) means for measuring the electrical resistance to the passage of said current with respect to time when said rotatable cylinder is rotated in pressure engagement against said metal member, and
(g) means for simultaneously measuring the amount of drag exerted upon said metal member by said metal cylinder when said cylinder is rotated.

3. An apparatus as defined in claim 2 wherein said metal member comprises a replaceable metal ball, said metal ball providing said singular contact with said metal cylinder.

4. An apparatus useful for simultaneously measuring the extent of metallic contact and friction between sliding lubricated surfaces which comprises in combination:
(a) supporting means,
(b) an arm pivotedly mounted on said supporting means,
(c) a single metal ball carried ball carried by said arm,
(d) a rotatable metal cylinder in bearing engagement with said single metal ball,
(e) means for applying a load to said arm whereby said metal ball is urged into pressure engagement with said rotatable cylinder,
(f) means for applying a lubricant between said ball and said rotatable cylinder,
(g) means for passing an electrical current through said ball and said rotatable cylinder,
(h) means for measuring the electrical resistance to said current flowing between said ball and said rotatable cylinder with respect to time, and
(i) means for simultaneously measuring deflection of said arm caused by drag exerted upon said metal ball by said rotatable cylinder when said cylinder is rotated.

5. An apparatus as defined in claim 4 wherein said means for measuring said deflection comprises a differential transformer attached to said supporting means and an iron core carried by said arm, said iron core having one end extending into said differential transformer whereby movement of said arm varies the position of said core within said transformer to thereby cause variation in electrical output of said transformer.

References Cited in the file of this patent

UNITED STATES PATENTS

| 1,989,627 | Saga | Jan. 29, 1935 |
| 2,337,414 | Rieber | Dec. 21, 1943 |
| 2,370,606 | Morgan et al. | Feb. 27, 1945 |
| 2,808,563 | Hornbostel | Oct. 1, 1957 |
| 3,028,746 | Sonntag et al. | Apr. 10, 1962 |

OTHER REFERENCES

"Electrical Method for Studying Oil Film Thickness," by Automotive and Aviation Industries, July 1943, pages 44 and 80 relied on.

Lauer et al.: "Device for Measuring Friction," Review of Scientific Inst., April 1957, pages 294 and 295 relied on.